United States Patent [19]

Gray

[11] Patent Number: 5,303,449
[45] Date of Patent: Apr. 19, 1994

[54] THREAD INHIBITING CASTER ASSEMBLY

[75] Inventor: Dale A. Gray, Jackson, Mich.

[73] Assignee: Albion Industries, Inc., Albion, Mich.

[21] Appl. No.: 940,064

[22] Filed: Sep. 3, 1992

[51] Int. Cl.5 .............................................. B60B 33/00
[52] U.S. Cl. ................... 16/18 CG; 16/18 R
[58] Field of Search .................. 16/18 CG, 18 R, 25, 16/31 A, 37, 38, 39, 40, 45

[56] References Cited

U.S. PATENT DOCUMENTS

| 1,845,417 | 2/1932 | Ingham | 16/18 R |
|---|---|---|---|
| 2,476,193 | 7/1949 | Hirschmugl | 16/18 CG |
| 2,606,791 | 8/1952 | Specht | 16/18 CG |
| 2,742,663 | 4/1956 | Meadows | 16/45 |
| 2,838,349 | 6/1958 | Maas | 16/18 CG |
| 2,951,258 | 9/1960 | Brooks et al. | 16/18 CG |
| 3,127,632 | 4/1964 | Rice et al. | 16/18 CG |
| 4,229,855 | 10/1980 | Rowe | 16/31 R |

FOREIGN PATENT DOCUMENTS

| 139685 | 12/1950 | Australia | 16/18 CG |
|---|---|---|---|
| 449334 | 7/1936 | United Kingdom | 16/31 A |

Primary Examiner—Paula A. Bradley
Assistant Examiner—Chuck Y. Mah
Attorney, Agent, or Firm—Todd S. Parkhurst; Stuart I. Graff; Lynn E. Rzonca

[57] ABSTRACT

A single leg caster assembly is disclosed. The assembly includes a wheel retaining hub and axle which support a bearing and wheel. A portion of the axle and a portion of the wheel retaining hub act as thread guards to inhibit thread from becoming tangled on the axle and in the bearing.

11 Claims, 1 Drawing Sheet

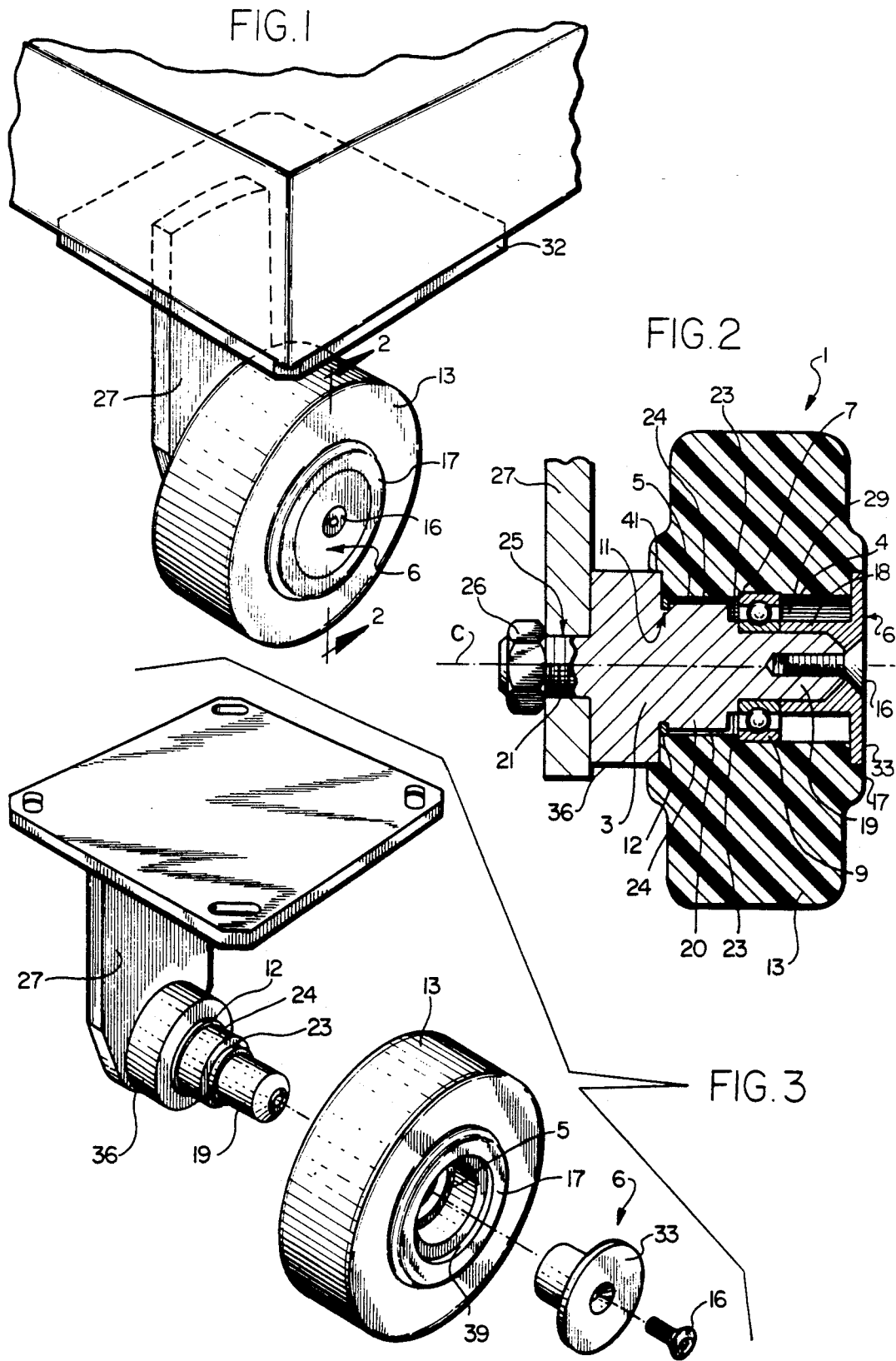

THREAD INHIBITING CASTER ASSEMBLY

FIELD OF THE INVENTION

This invention relates generally to caster assemblies, and more particularly to caster assemblies employing a wheel retaining hub and axle arranged to guard against threads becoming entangled in the bearing and on the axle.

BACKGROUND OF THE INVENTION

Carts and dollies are often used in textile factories and textile mills to transport textile and other objects from one work or storage station to another. Those carts are often provided with casters, which enable the cart to roll. Textile mills may have loose threads and fibers on the floor of the work or storage areas. Many conventional casters permit the loose thread to become tangled on the axle and in the bearings and thereby inhibit the rolling of the caster.

Some caster designs have attempted to inhibit thread from entering the axle area and tangling on the axle. An example of such a design is disclosed in U.S. Pat. No. 2,742,663. Although that design does, to some extent, inhibit thread from tangling around the axle, the design does not entirely prevent thread wrap. Allowing some threads into the caster assembly was not often a severe problem when cotton and other natural fibers were used. These natural fibers pose little risk of jamming or damaging the caster because they tend to break down and decay from the friction and other forces present in the axle area. In contrast, modern, synthetic fibers do not tend to break down and decay. Instead, these much tougher fibers will clog the caster and may even cut through the plastic wheel, mar the metal axle, or damage a wheel bearing Thus, keeping these fibers out of the caster assembly is of even greater importance.

Moreover, previous caster designs were difficult to disassemble and clean when thread did become tangled around the axle. Those casters are not comprised of individual replacement parts such that each component part could be taken out, cleaned and replaced individually if it was worn or otherwise had failed to operate. Instead, entire portions of the assembly must be replaced.

In addition, those designs do not provide inner and outer support for the bearings. The bearings are therefore susceptible to damage caused by lateral forces exerted in directions other than in the plane in which the bearing is intended to turn. These forces may cause the bearing to shift its position along the axle and can cause excessive bearing wear.

Accordingly, it is an object of the present invention to provide a caster assembly including a wheel retaining hub and axle portions that inhibit thread and lint from becoming wound around the axle and bearing.

Another object of this invention is to provide a thread inhibiting caster assembly that contains a small number of parts, so that the caster can be easily assembled and disassembled.

It is a further object of this invention to provide a thread inhibiting caster assembly in which each component part can be individually and easily replaced should it become worn.

Still another object of the present invention is to provide a thread inhibiting caster assembly including a bearing support to prevent the bearing inner race from shifting locations on the axle, and to reduce bearing wear resulting from lateral forces on the caster assembly.

Another object of the present invention is to provide a thread inhibiting caster assembly including a bearing stop associated with the wheel that centers the bearing within the wheel, and provides support for the outer race against lateral forces.

Other objects and advantages of the invention will become apparent upon reading the following detailed description and upon reference to the drawings. Throughout the drawings, like reference numerals refer to like parts.

SUMMARY OF THE INVENTION

The present invention relates to a thread inhibiting caster assembly. The assembly comprises an axle that forms a mount for a bearing, an axle inner shoulder bearing support to prevent the bearing from slipping inwardly along the shaft, an axle inner thread guard to inhibit thread from entering the inner axle area, an "O" ring channel and "O" ring, and an "O" ring axle portion to inhibit thread that has entered the axle area from working toward and tangling in the bearing. A bearing is inserted within the wheel and pressed against the bearing stop included in the wheel. The wheel and bearing combination is then placed on the axle so that the bearing is in abutment with the inner shoulder bearing support. A hub is attached to the axle, thereby forming an outer bearing support and an outer thread guard. The outer and inner bearing supports prevent the bearing from slipping along the length of the axle. The outer and inner thread guards, in combination with the "O" ring and "O" ring axle portion, inhibit threads from tangling on the axle or in the bearing.

DESCRIPTION OF THE DRAWINGS

FIG. 1 is a perspective view of the caster assembly of the present invention.

FIG. 2 is a sectional view of the caster assembly of the present invention taken substantially in the plane of line 2—2 in FIG. 1.

FIG. 3 is an exploded view of the caster assembly of the present invention.

DETAILED DESCRIPTION

While the invention will be described in connection with a preferred embodiment and procedure, it will be understood that it is not intended to limit the invention to this embodiment and procedure. On the contrary, it is intended to cover all alternatives, modifications and equivalents as may be included within the spirit and scope of the invention.

Referring to FIG. 2, a thread inhibiting caster assembly having relatively few parts in accordance with the present invention is designated generally by reference number 1. The caster assembly 1 shown here includes only an axle 3, a wheel retaining hub 6, a bearing 9, a wheel 13, a screw 16, and an "O" ring 12. As shown in FIG. 2, the axle 3 preferably includes at least four different portions of different diameters. The bearing 9 is mounted on the bearing mounting portion 19 of the axle 3, which has a small diameter as compared to the other portions of the axle 3. (In the preferred embodiment, the bearing 9 is sealed so that it requires no lubrication.) An inner shoulder bearing support 23 is formed from a portion of the axle having a diameter slightly larger than the bearing mounting portion 19 of the axle 3. The inner shoulder bearing support 23 abuts a side of the bearing and prevents the bearing from slipping on the axle in one direction, in accordance with another aspect of the invention.

The wheel 13 has at least two different inner diameters. The first inner wheel diameter 4 corresponds to the outer diameter of the bearing 9 such that the wheel 13 is mounted on, and in interference engagement with, the outer circumference of the bearing 9. The second inner wheel diameter 5 is slightly smaller than the first inner wheel diameter 4 and forms a bearing stop 7 that ensures the bearing 9 is longitudinally centered within the wheel 13 and also forms a support for the outer race of the bearing 9. Thus, the bearing stop 7 allows the bearing 9 to be quickly and easily inserted in the wheel 13 during assembly and subsequent maintenance.

In the preferred embodiment, the wheel retaining hub 6 is attached to the distal end of the axle 3 by means of a screw 16. As shown in FIG. 2, the wheel retaining hub 6 includes a cylindrical extension 18 having a bore whose inner diameter is slightly larger than the diameter of the bearing mounting portion 19 of the axle 3. The portion of the wheel retaining hub 6 that defines the cylindrical bore thereby forms an outer bearing support 29 that abuts the inner race of the bearing 9 and prevents the bearing from slipping on the axle in the direction of the outer bearing support 29. The outer bearing support 29 and the inner shoulder bearing support 23 on the axle in combination with the bearing stop 7 on the wheel 13 prevent the bearing from sliding along the length of the axle 3, in accordance with yet another aspect of the invention. Moreover, the bearing supports in combination with the bearing stop 7 act together to provide the bearing with lateral support, thereby decreasing the potential wear on the bearing from lateral forces (those forces parallel to the centerline C of the axle).

The wheel retaining hub 6 includes an outer thread guard portion 33 that extends radially outward from the centerline C of the axle 3. To guard against threads becoming tangled on the axle 3 or in the bearing 9, the outer thread guard portion 33 substantially covers the entire opening of the bore formed in the wheel 13, as shown in FIG. 2. Furthermore, as shown in FIG. 3, the wheel preferably includes an axial recess 39 with a diameter that corresponds to the diameter of the outer thread guard portion 33. The surface of the outer thread guard 33 on the retaining hub 6 is thereby flush with the surface 17 of the wheel 13, as shown in FIG. 1 and FIG. 2, further inhibiting the introduction of threads and fibers into the axle 3 and bearing 9 in accordance with the invention. To prevent wheel binding and wear, there is a small gap between the outer thread guard portion 33 and the wheel 13. The outer thread guard portion 33 does not normally contact the wheel 13.

The axle 3 includes an "O" ring axle portion 24 that is larger in diameter than the bearing support 23 and is slightly smaller than the second inner wheel diameter 5 so that there is a small gap 20 between the wheel and axle. The small size of the gap 20 further inhibits threads that have gotten past the inner thread guard portion 36 from tangling in the bearing 9. Included in the "O" ring axle portion 24 is an "O" ring channel 11 for accepting an "O" ring 12. The "O" ring 12 has an outer diameter that corresponds substantially to the second inner wheel diameter 5 of the wheel 13. The "O" ring provides yet further means for inhibiting the entry of threads onto the axle 3 and into the bearing 9.

The axle 3 also includes an inner thread guard portion 36 which has a diameter larger than the diameter of the bearing mounting portion 19 of the axle 3, larger than the inner shoulder bearing support portion 23 of the axle and larger than the "O" ring axle portion 24. The inner thread guard portion 36 has a diameter larger than the diameter of the opening formed by the second inner wheel diameter 5 such that the inner thread guard 36 covers substantially the entire bore opening, thereby inhibiting threads from becoming tangled on the axle 3 or in the bearing 9. Also, the wheel 13 preferably includes an axial recess with an inner diameter just slightly larger than the outer diameter of the inner thread guard portion 36, as shown generally by reference number 41 in FIG. 2. To prevent wheel binding and wear, there is a small gap between the inner thread guard portion 36 and the wheel 13. The inner thread guard portion 36 does not normally contact the wheel 13.

As can be seen in FIG. 2, the axle 3 preferably includes a threaded proximal portion 21. The threaded proximal portion 21 of the axle 3 is inserted through a hole 25 in the caster leg 27. A nut 28 is fastened to the threaded portion 21 to thereby attach the caster assembly 1 to the caster leg 27. As shown in FIG. 1, the caster leg 27 is preferably attached to a base plate 32, which in turn can be attached to a cart or dolly. It will be understood that although the present invention is described in reference to a fixed base plate 32, it also encompasses the use of the thread inhibiting caster assembly in connection with a swivel base plate.

It can be appreciated from the foregoing description that the preferred embodiment of the present invention has substantially fewer parts than traditional casters, and that any of the parts may be individually replaced without having to replace entire assemblies. Moreover, because the only means necessary to assemble all the parts is a screw and wrench, the preferred embodiment can be easily assembled and disassembled without special tools or know how. Maintenance can therefore easily be performed without removing the caster assembly from the cart.

What is claimed is:

1. A thread inhibiting caster assembly comprising:
   an axle having a proximal end and a distal end, wherein said proximal end is attached to a caster leg;
   a bearing rotatably mounted on the axle;
   a wheel having a cylindrical bore wherein said bearing is mounted within the bore of said wheel;
   a wheel retaining hub attached to the distal end of said axle for retaining the wheel on the axle; and
   an "O" ring insert located inside said wheel and mounted within an axial "O" ring channel formed in said axle.

2. A thread inhibiting caster assembly according to claim 1, wherein said axle further comprises an inner thread guard portion for inhibiting thread from becoming wrapped around said axle.

3. A thread inhibiting caster assembly according to claim 1, wherein said cylindrical bore further comprises a bearing stop.

4. A thread inhibiting caster assembly according to claim 1, wherein said wheel retaining hub further comprises an outer thread guard portion for inhibiting thread from becoming wrapped around said axle.

5. A thread inhibiting caster assembly according to claim 1, further comprising a screw for attaching said wheel retaining hub to said axle.

6. A thread inhibiting caster assembly comprising:
an axle having a proximal and distal end;
a bearing mounted on the axle wherein a portion of said bearing rotates around an axis formed by the axle;
a wheel having a bore, wherein the bearing is within the bore and the outer circumference of said bearing is in contact with the portion of the wheel forming the bore;
a wheel retaining hub attached to the distal end of said axle, for retaining the wheel on the axle;
inner shoulder bearing support means integral with said axle for supporting the bearing against lateral forces acting in a direction perpendicular to the plane formed by the bearing; and
outer bearing support means integral with said wheel retaining hub for supporting the bearing against lateral forces.

7. A thread inhibiting caster assembly according to claim 6, wherein said axle further comprises thread inhibiting means for inhibiting thread from becoming wrapped around said axle.

8. A thread inhibiting caster assembly according to claim 7, wherein said axle further comprises an "O" ring axle portion having an "O" ring channel.

9. A thread inhibiting caster assembly according to claim 8, further comprising an "O" ring inserted within said "O" ring channel.

10. A thread inhibiting caster assembly according to claim 6, wherein said bore in said wheel further comprises a bearing stop.

11. A thread inhibiting caster assembly according to claim 6, wherein said wheel retaining hub further comprises thread inhibiting means for inhibiting thread from becoming wrapped around said axle.

* * * * *